United States Patent
Fowler

[15] 3,683,275
[45] Aug. 8, 1972

[54] APPARATUS FOR MEASURING THE VALUE OF AN ALTERNATING ELECTRICAL SIGNAL OF ANY WAVE FORM

[72] Inventor: Eliot Patrick Fowler, Swanage, Dorset, England

[73] Assignee: United Kingdom Atomic Energy Authority, London, England

[22] Filed: Aug. 5, 1968

[21] Appl. No.: 750,116

[30] Foreign Application Priority Data

Aug. 8, 1967 Great Britain..........36,472/67

[52] U.S. Cl................324/115, 307/230, 324/123 R, 324/132, 328/145
[51] Int. Cl............................G01r 15/10, G01r 1/30
[58] Field of Search........324/115, 119, 123, 99, 132; 328/145; 307/230

[56] References Cited

UNITED STATES PATENTS

| | | | |
|---|---|---|---|
| 2,366,618 | 1/1945 | Harrison | 324/99 X |
| 2,403,521 | 7/1946 | Gilbert | 324/123 X |
| 2,757,281 | 7/1956 | LeBel | 324/132 X |
| 3,361,975 | 1/1968 | Rorden et al. | 328/145 X |
| 3,502,959 | 3/1970 | Stellman | 328/145 X |

Primary Examiner—Rudolph V. Rolinec
Assistant Examiner—Ernest F. Karlsen
Attorney—Larson, Taylor and Hinds

[57] ABSTRACT

The measurement of an a.c. signal is accomplished by feeding the signal through an a.c. amplifier having variable gain to a detector from which a d.c. signal characteristic is extracted indicative of its value. The d.c. signal is fed back to control the amplifier gain and maintain the level of the detector input within a limited range.

6 Claims, 3 Drawing Figures

ARTICLE FOR MEASURING THE VALUE OF AN ALTERNATING ELECTRICAL SIGNAL OF ANY WAVE FORM

This invention relates to apparatus for measuring the value of an alternating electrical signal of any waveform. As the value of an alternating signal can have many definitions, it is usual to detect some characteristic of signal magnitude and to measure the value of this characteristic. Suitable characteristics for this purpose include the mean rectified value, the peak value and the mean square value and devices for sensing such values are referred to herein as detectors.

Many of these detectors are limited in range to less than one decade (or 10:1) of the unknown signal and although in some instances this meets the requirements for which the detector was selected, certain instruments, in particular nucleonic instruments, often require a wide range of continuous indication.

According to the present invention an apparatus for measuring the value of an alternating electrical signal comprises an a.c. variable gain amplifier connected to receive said signal, the a.c. amplifier being linear to the incoming signal and incorporating a variable gain control which is operative in response to a change in a control signal applied thereto, to vary a.c. amplifier gain in an inverse sense according to a logarithmic law, a detector arranged to detect a characteristic of the magnitude of the a.c. amplifier output and to provide a corresponding d.c. output signal, a d.c. amplifier for amplifying said d.c. signal, an overall feedback loop connecting the d.c. amplifier output to said variable gain control means whereby a change in the d.c. amplifier output level effects a change in the gain of the a.c. amplifier, and means employing the output of the d.c. amplifier as a measure of the magnitude of said a.c. signal.

The gain controlling means may be a simple wide range (but not necessarily linear) voltage controlled resistor disposed in series with the input signal and adjusted in value by the controlling signal obtained from the output of a detector. Thus at all signal levels, the value of the voltage controlled resistor will be a function of the output of the detector.

Figure 1:
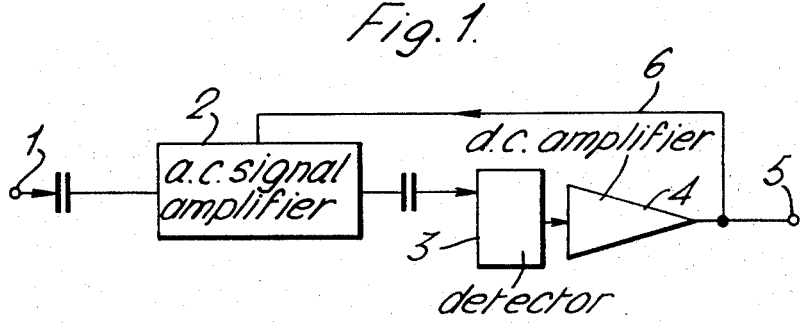
FIG. 1 is a block diagram of an a.c. signal measuring system.

Referring to FIG. 1, a varying input signal current at terminal 1 is supplied to an a.c. variable gain amplifier 2 which incorporates a variable gain control operable in response to an applied control signal. A detector 3 receives the output from the amplifier 2 and detects a characteristic of the magnitude of the amplified signal. This characteristic which may be a peak value, a mean rectified value, an r.m.s. value or another suitable value is amplified in the form of a direct current in a second amplifier 4 from the output of which an overall feedback is applied through loop 6 as a control signal to the gain controlling means of amplifier 2. The output of amplifier 4 is displayed on indicator and recorder 5.

Figure 2:
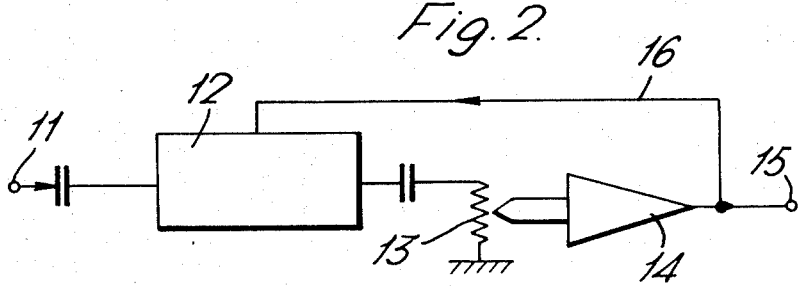
FIG. 2 is also a block diagram of a system for measuring the r.m.s. value of varying current over many decades and, FIG. 3 shows the main components of one suitable amplifier circuit for use as item 12 in the system of FIG. 2.

In FIG. 2 a varying input signal current from a transducer, in this case an ion chamber exposed to a neutron flux, is applied to the input of an a.c. signal amplifier 12. The latter incorporates amplifier gain control means through which, as before, the gain of the amplifier is controllable in response to a control signal. The output of the amplifier 12 is applied to the heater of an indirectly heated thermistor 13 serving as a mean square detector, the d.c. output from which is amplified in d.c. amplifier 14. From the latter the output is taken to a suitable terminal 15 for connection to an indicator. Additionally, the output signal is applied to a feedback loop 16 to the gain control means of the a.c. amplifier 12. The r.m.s. value of signals at the thermistor thus determines the gain of the amplifier 12. Whilst the latter is linear to the ingoing signal from the transducer, its gain is a function of the controlling d.c. signal. Any departure of the output of the r.m.s. detector from a predetermined level leads to a change in the controlling signal and a consequent change in the amplifier gain controlling means in a sense tending to restore the r.m.s. detector output close to its previous level. An adequate gain in the d.c. amplifier will ensure that the signal level at the r.m.s. detector is virtually constant for the whole range of the controlling signals. Under these circumstances the r.m.s. detector need have no measurable effect on the linearity of the system.

Figure 3:
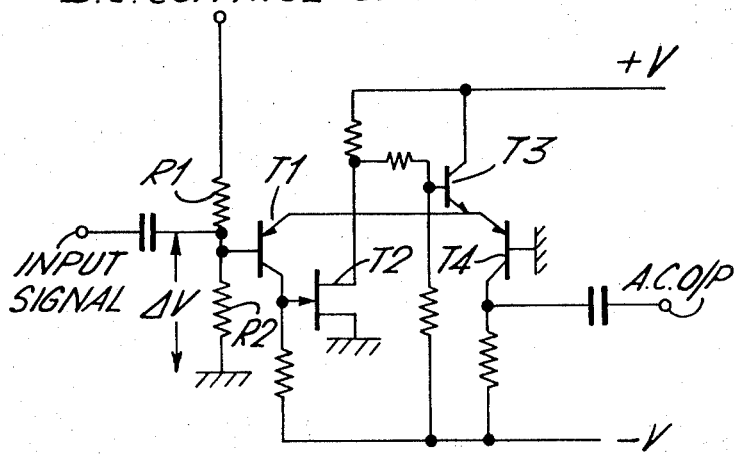

FIG. 3 shows a circuit for a logarithmic gain amplifier suitable for use as the signal amplifier 2 in FIG. 1 in which the bipolar transistor T4 is used to provide an exponential control of a gain in response to the d.c. control signal.

The emitter of the transistor T4 is driven from the temperature compensating attenuator R1/R2 via the unity gain voltage amplifier comprising T1, T2 and T3.

For a bipolar transistor, the small signal transconductance $g_m$ is given by $$g_m = \frac{2Ic}{KT}$$

and the collector current Ic is given by $$Ic = I_o\left(e^{\frac{2V}{KT}} - 1\right)$$

If $$\frac{2V}{KT} \gg 1, \quad Ic \approx I_o e^{\frac{2V}{KT}}$$

Hence $$g_m \approx \frac{2I_o}{KT} e^{\frac{2V}{KT}} \quad (1)$$

where $q$ is the electronic charge = $1.6 \times 10^{-19}$ Coulombs; $k$ is Boltzmann's constant = $1.38 \times 10^{-23}$ Joule/°K; $T$ is the absolute temperature °K; $I_o$ is the saturation current due to diffusion in the transistor junction and $V$ is the transistor base/emitter voltage.

Since $I_o$ is itself a function of temperature, the transconductance $g_m$ given by Equation (1) is highly temperature dependent.

To compensate for the variation of $I_o$ with temperature, the transistor T4 is driven from a similar transistor T1. The transistors T1 and T4 are selected to have equal values of base/emitter voltage at equal values of collector current so as to define the working point accurately.

Under those conditions, when the collector current $I_{c1}$ of the drive transistor T1 is maintained constant by the local negative feedback in the loop comprising T1, T2 and T3, the transconductance $g_m$ of the logarithmic gain transistor T4 may be shown to be $$g_m = \frac{2I_{c1}}{KT} e^{\frac{2\Delta V}{KT}} \quad (2)$$

where $\Delta V$ is the difference between the base/emitter voltages of T1 and T4. The other symbols are as previously defined.

From the expression for $g_m$ in Equation (2), it may be shown that by applying both the controlling d.c. signal fed back from the r.m.s. detector and the controlled a.c. input signal to a temperature sensitive attenuator R1/R2 having a temperature coefficient equal to $1/T$, the logarithmic transfer characteristic between the a.c. input and the d.c. control signal is substantially independent of temperature.

Using a bipolar transistor as a logarithmic element the system has been shown to operate satisfactorily over four decades of input signal (1:10,000).

For this reason the invention finds particularly advantageous application to the measurement of neutron flux from ionization chamber signals. As is known the application of this so-called Campbell system to the measurement of neutron flux for reactor control purposes or other purposes is advantageous for its low response to gamma radiation. The system makes use of the fact that the mean square value of the current fluctuations from an ion-chamber placed in a neutron flux is proportional to neutron flux. The wide range over which flux has to be measured would normally call for switched amplifiers to cater for say each decade of input signal since direct r.m.s. detection used for extracting the mean value of the signal to be measured.

In accordance with the example described a wide range amplifier is possible using this invention. The amplifier is one which although linear to the ingoing fluctuating signal from an ionization chamber has its gain varied exponentially under the control of a d.c. signal. This d.c. control signal is a d.c. signal fed back from a detector which detects a mean square value of the amplified a.c. signal and is therefore a simple function of the logarithm of the mean square or r.m.s. value of the input signal.

What we claim is:

1. An apparatus for measuring a varying electrical signal comprising an a.c. variable gain amplifier for receiving said signal, said a.c. amplifier being linear to the received signal and incorporating a variable gain control means in the forward path of the a.c. amplifier for varying the amplifier gain, said gain control means being operative in response to a change in a control signal applied thereto to vary the a.c. gain of said amplifier in an inverse sense, according to a logarithmic law, a detector means for detecting a characteristic of the magnitude of the output of the a.c. amplifier and for providing a corresponding d.c. output signal, a d.c. amplifier means for amplifying the output of said detector means, an overall feedback loop for connecting the output of said d.c. amplifier to said variable gain control means as a said control signal such that a change in the d.c. amplifier output level effects a change in the gain of the a.c. amplifier, and means employing the output of the d.c. amplifier means as a measure of the magnitude of said a.c. signal.

2. A signal measuring device as claimed in claim 1 in which the gain control means comprises a voltage controlled resistor connected in series with the input signal.

3. A signal measuring device as claimed in claim 1 in which the detector means has a transfer characteristic such that the output thereof represents a mean value of the a.c. amplifier output signal.

4. A signal measuring device as claimed in claim 3 in which the detector means has a transfer characteristic such that the output thereof represents the root mean square value of the a.c. amplifier output signal.

5. A signal measuring device as claimed in claim 2 in which the voltage controlled resistor has a logarithmic characteristic.

6. A signal measuring device as claimed in claim 4 in which the resistor is bipolar transistor.

* * * * *